(12) United States Patent
Cheng et al.

(10) Patent No.: US 8,115,709 B2
(45) Date of Patent: Feb. 14, 2012

(54) ELECTRO-WETTING DISPLAY DEVICE

(75) Inventors: Jia-Shyong Cheng, Miao-Li (TW); Shing-Shiang Chang, Miao-Li (TW); Chih-Han Chao, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 785 days.

(21) Appl. No.: 12/220,525

(22) Filed: Jul. 25, 2008

(65) Prior Publication Data

US 2009/0027317 A1    Jan. 29, 2009

(30) Foreign Application Priority Data

Jul. 25, 2007    (CN) .......................... 2007 1 0075317

(51) Int. Cl.
*G09G 3/34* (2006.01)

(52) U.S. Cl. ............................... 345/84; 345/88; 345/92

(58) Field of Classification Search ............ 345/84–100, 345/204–215, 690; 359/220–228, 253, 290–297
See application file for complete search history.

(56) References Cited

U.S. PATENT DOCUMENTS

| 7,872,790 B2 * | 1/2011 | Steckl et al. .................. 359/253 |
| 2006/0200106 A1 | 9/2006 | Okubo |
| 2007/0263306 A1 | 11/2007 | Hayes et al. |
| 2008/0297880 A1 * | 12/2008 | Steckl et al. .................. 359/291 |
| 2009/0027760 A1 * | 1/2009 | Wang et al. .................... 359/291 |
| 2010/0109987 A1 * | 5/2010 | Jessop ............................ 345/84 |

* cited by examiner

*Primary Examiner* — Vijay Shankar
(74) *Attorney, Agent, or Firm* — Altis Law Group, Inc.

(57) ABSTRACT

An exemplary electro-wetting display (EWD) device includes an upper substrate, a lower substrate opposite to the upper substrate, a plurality of side walls interposed between the upper and lower substrates and cooperating with the upper and lower substrates to form a plurality of pixel units, a first polar liquid disposed in the pixel units, a second, colored, non-polar liquid disposed in the pixel units and being immiscible with the first liquid, and a plurality of scanning lines disposed on the lower substrate and parallel to and spaced apart from each other for providing scanning signals to the pixel units. Each of the pixel units corresponds to at least part of a corresponding previous scanning line.

17 Claims, 7 Drawing Sheets

ELECTRO-WETTING DISPLAY DEVICE

FIELD OF THE INVENTION

The present invention relates to display devices, and more particularly to an electro-wetting display device having first and second immiscible fluid within a space between a first transparent support plate and a second support plate.

GENERAL BACKGROUND

Display devices like TFT-LCDs (thin film transistor liquid crystal displays) are used in laptop computers, but also find an increasingly wider application in GSM telephones. Instead of LCDs, for example, (polymer) LED display devices are also being used. Apart from these types of displays, other display techniques, such as electro-wetting display (EWD) devices, which are suitable for flat plate displays are evolving. The electro-wetting functionality provides displays with excellent brightness and contrast, and relatively low power consumption compared to many other display technologies.

However, while EWD power consumption is albeit lower than power consumption for optical elements used in many other display technologies, it is still quite high for some applications, such that a very low power consumption EWD device is desired.

It is, therefore, needed to provide an EWD device that can overcome the above-described deficiencies.

SUMMARY

An EWD device includes an upper substrate, a lower substrate opposite to the upper substrate, a plurality of side walls interposed between the upper and lower substrates and cooperating with the upper and lower substrates to form a plurality of pixel units, a first polar liquid disposed in the pixel units, a second, colored, non-polar liquid disposed in the pixel units and being immiscible with the first liquid, and a plurality of scanning lines disposed on the lower substrate and parallel to and spaced apart from each other for providing scanning signals to the pixel units. Each of the pixel units corresponds to at least parts of a corresponding previous scanning line.

An EWD device includes an upper substrate, a lower substrate opposite to the upper substrate, a plurality of side walls interposed between the upper and lower substrates and cooperating with the upper and lower substrates to form a plurality of pixel units, a first polar liquid disposed in the pixel units, a second, colored, non-polar liquid disposed in the pixel units and being immiscible with the first liquid, and a plurality of scanning lines disposed on the lower substrate and parallel to and spaced apart from each other for providing scanning signals to the pixel units. A region of each pixel unit covered by a corresponding previous scanning line defines a containing region for containing the second liquid while the second liquid being pushed by the first liquid.

Other novel features and advantages will become more apparent from the following detailed description when taken in conjunction with the accompanying drawings, in which:

DETAILED DESCRIPTION OF PREFERRED EMBODIMENTS

Reference will now be made to the drawings to describe preferred and exemplary embodiments of the present invention in detail.

Figure 1:
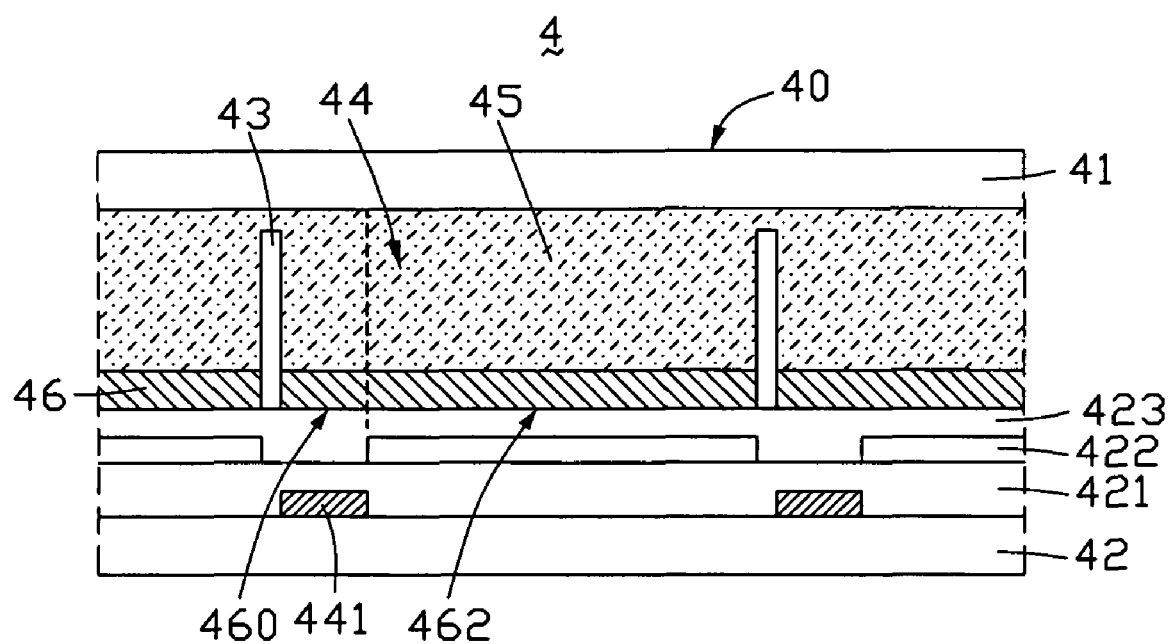
FIG. 1 is a side, cross-sectional view of parts of an EWD device according to a first embodiment of the present invention, the EWD including a second substrate.

Referring to FIG. 1, a side, cross-sectional view of parts of an EWD device 4 according to a first embodiment of the present invention is shown. The EWD device 4 includes a first substrate 41, a second substrate 42 disposed parallel to and spaced apart from the first substrate 41, and a plurality of side walls 43 interposed between the first and second substrates 41, 42. The side walls 43 are arranged in a matrix and cooperate with the first and second substrates 41, 42 to form a plurality of receiving spaces 44. The side walls 43 also divide the EWD device 4 into a multiplicity of pixel units 40 in an array type. The first substrate 41 is made of transparent material, such as glass, plastic or the like.

The space 44 of each of the pixel units 40 is filled with a first liquid 45 and a second liquid 46. The first liquid 45 is polar, conductive water solution or salt solution, such as a solution mixed with Ethyl Alcohol and potassium chloride solution. The second liquid 46 is non-polar, insulative liquid, such as oil, Alkane, Hexadecane or the like. The second liquid 46 can be colored with a dye (or in some cases pigment), and serves as a shielding liquid. The first and second liquid 45, 46 are immiscible.

Figure 2:
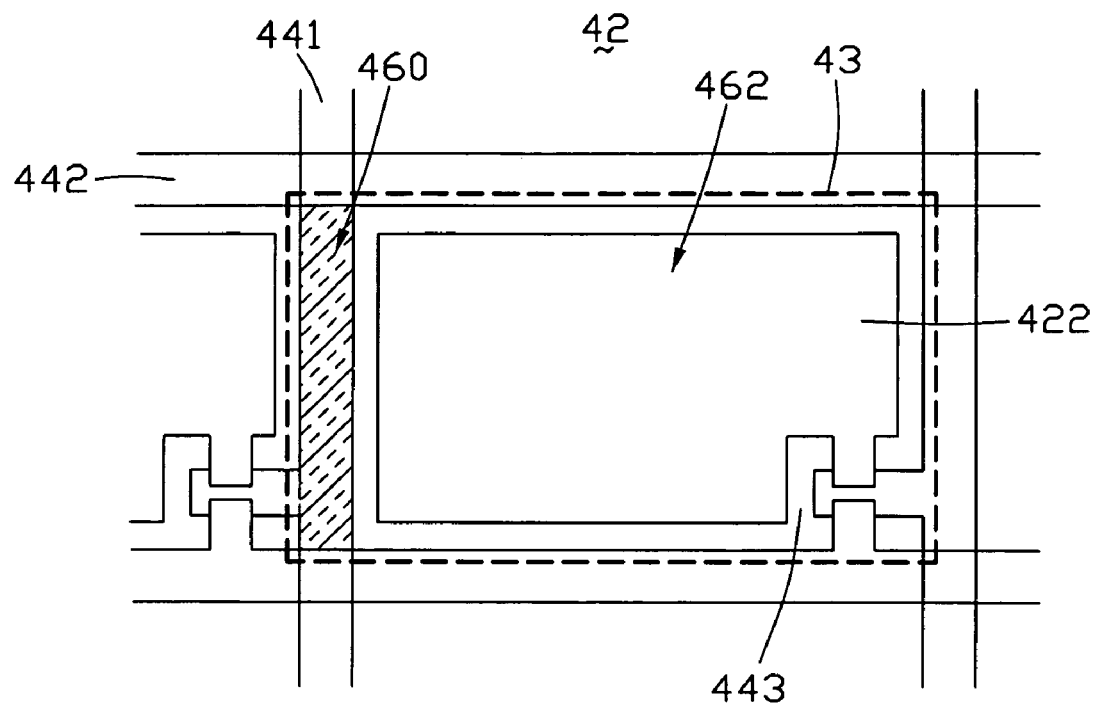
FIG. 2 is a top, plan view of a pixel unit of the second substrate of the EWD device of FIG. 1.

Also referring to FIG. 2, a top, plan view of one of the pixel units 40 is shown. The second substrate 42 includes a plurality of rows of parallel scanning lines 441, a plurality of columns of parallel data lines 442, and a plurality of thin film transistors 443 disposed near intersections of a corresponding one of the scanning lines 441 and a corresponding one of the data lines 442, a first insulating layer 421, a plurality of transparent electrodes 422, a second insulating layer 423. The scanning lines 441 are isolated from the data lines 442, and the first insulating layer 421 covers the scanning lines 441 and the data lines 442. The transparent electrodes 422 are disposed on the first insulating layer 421 and each transparent electrode corresponds to one of the spaces 44. The second insulating layer 423 covers the transparent electrode 422 and the first insulating layer 421. The transparent electrode 422 may be made of indium-tin-oxide (ITO), and the first insulating layer 421 may be made of Silicon Nitride. Further, the second insulating layer 423 may be made of hydrophobic material, such as an amorphous fluoropolymer.

As mentioned above, the side walls 43 divide the EWD device 4 into an array of pixel units 40, and each pixel unit 40 is arranged to correspond to parts of a previous scanning line 441. This arrangement may be described as follow: each of the pixel unit 40 includes a thin film transistor 443 that is used as a switch, and the thin film transistor 443 is connected to a corresponding scanning line 441. The scanning signal is supplied to the thin film transistor 443 by the corresponding scanning line 441. The previous scanning line 441 is adjacent to the current scanning line 441, which is connected to the thin film transistor 443 of the corresponding pixel unit 40. The previous scanning line 441 is scanned just before the current scanning line 441. Parts of the space 44 of the pixel unit 40 corresponding to the previous scanning line 441 are defined as a containing region 460, and parts of the space 44 of the pixel unit 40 corresponding to the transparent electrode 422 are defined as a display region 462.

Figure 3:
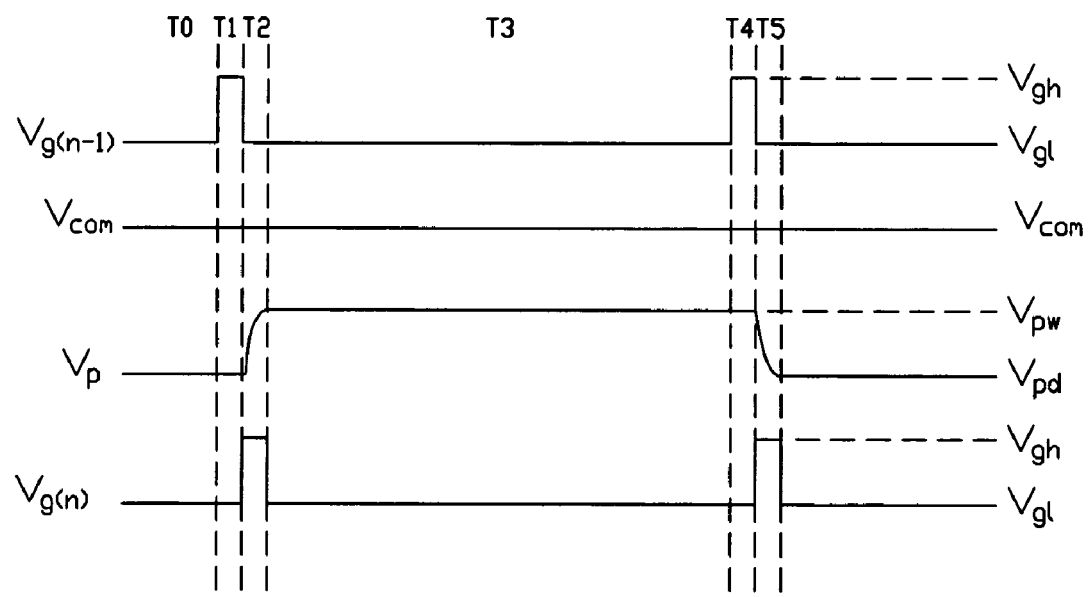
FIG. 3 is a waveform chart of driving voltage signals provided to the pixel unit of FIG. 2.

Referring to FIG. 3, a waveform chart showing driving voltage signals provided to the pixel unit 40 is shown. $Vg_{(n-1)}$ represents a voltage being supplied to the previous scanning line 441; $V_{g(n)}$ represents a voltage being supplied to the scanning line 441 of the pixel unit 40; $V_p$ represents a voltage being supplied to the transparent electrode 422 of the pixel unit 40; Vcom represents a voltage being supplied to the first fluid 45. The operation process of the EWD device 4 is described in a time period from T0 to T5.

Figure 4A:
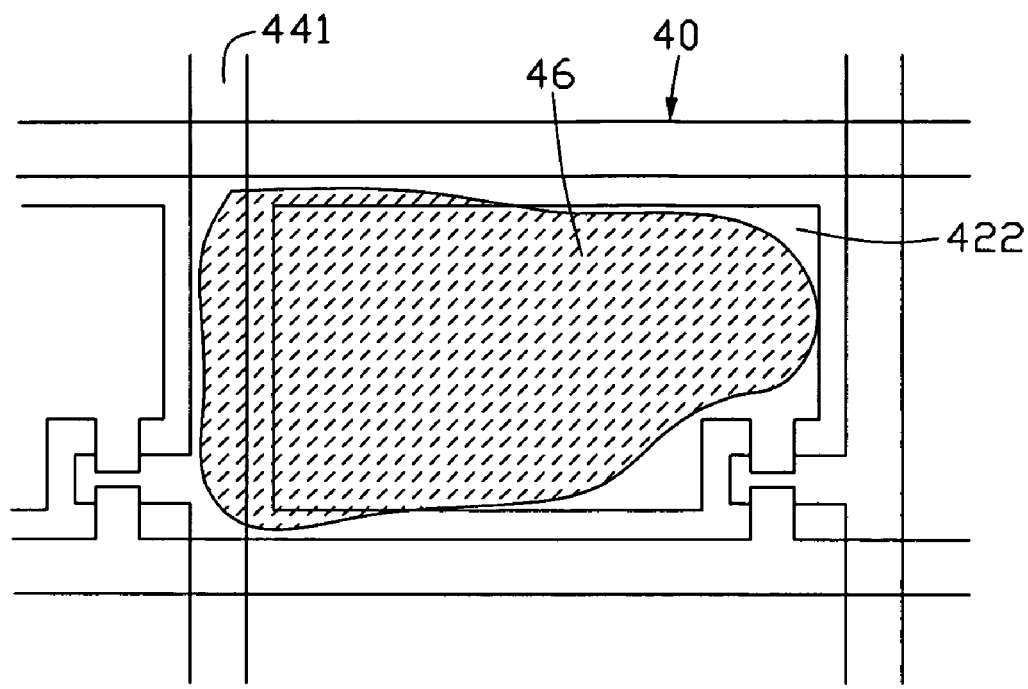
FIGS. 4A to 4F are schematic, sectional views of sequential stages of the pixel unit of FIG. 2 in the operation process of the EWD device of FIG. 1.

Referring to FIG. 4A, during the time period T0, the pixel unit 40 displays a previous image in a desired gray scale, whereas $V_{gl}-V_{com}=V_{pd}-V_{com}=0$, that is $V_{gl}=V_{pd}$. At this time, regions of the second insulating layer 423 corresponding to the (n−1)th (previous) scanning line 441 and the transparent electrode 422 of the nth pixel unit 40 have the greatest hydrophobic characteristics, and the second liquid 46 thoroughly covers all of the pixel units 40, such that the pixel units 40 displays a black image.

Figure 4B:
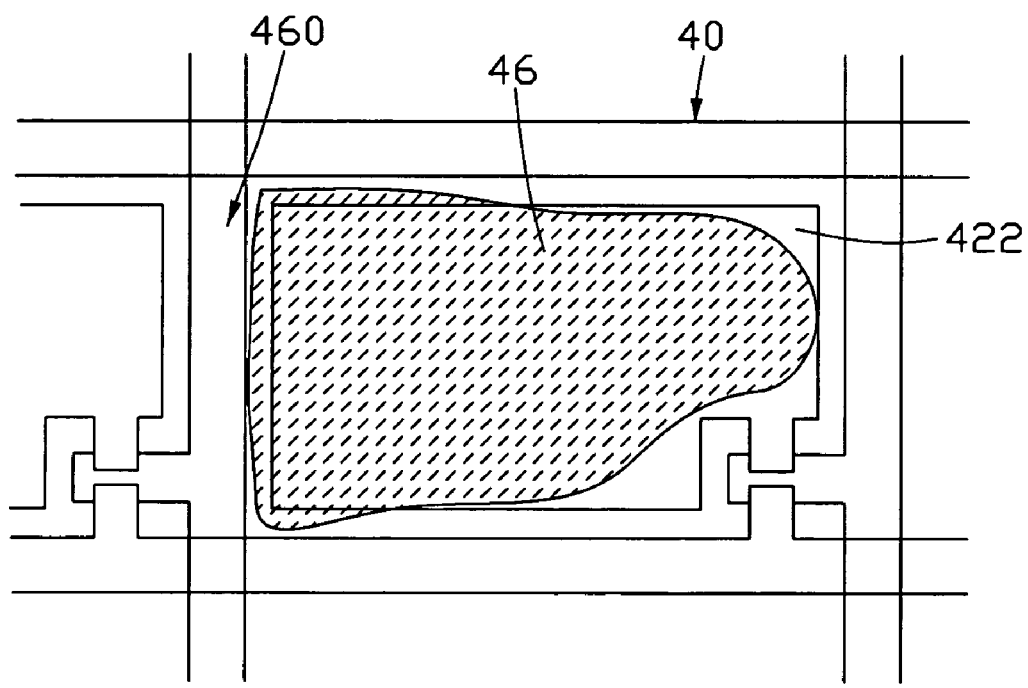

Referring to FIG. 4B, during the time period T1 and before the pixel unit 40 displays a current image, a voltage signal is supplied to the previous scanning line 441. At this time, $V_{gl}-V_{com}<V_p-V_{com}=0$, that is $V_{gl}<V_p$. Thereby, regions of the second insulating layer 423 corresponding to the (n−1)th (previous) scanning line 441 have the lowest hydrophobic characteristics, thus the first liquid 45 may push the second liquid 46 out of the containing region 460. Then, the second liquid 46 just cover regions of the second insulating layer 423 corresponding to the transparent electrode 422. The voltage signal supplied to the previous scanning line 441 may generate a pre-driving effect to the pixel unit 40, so as to increase the repeatability of gray scale.

Figure 4C:
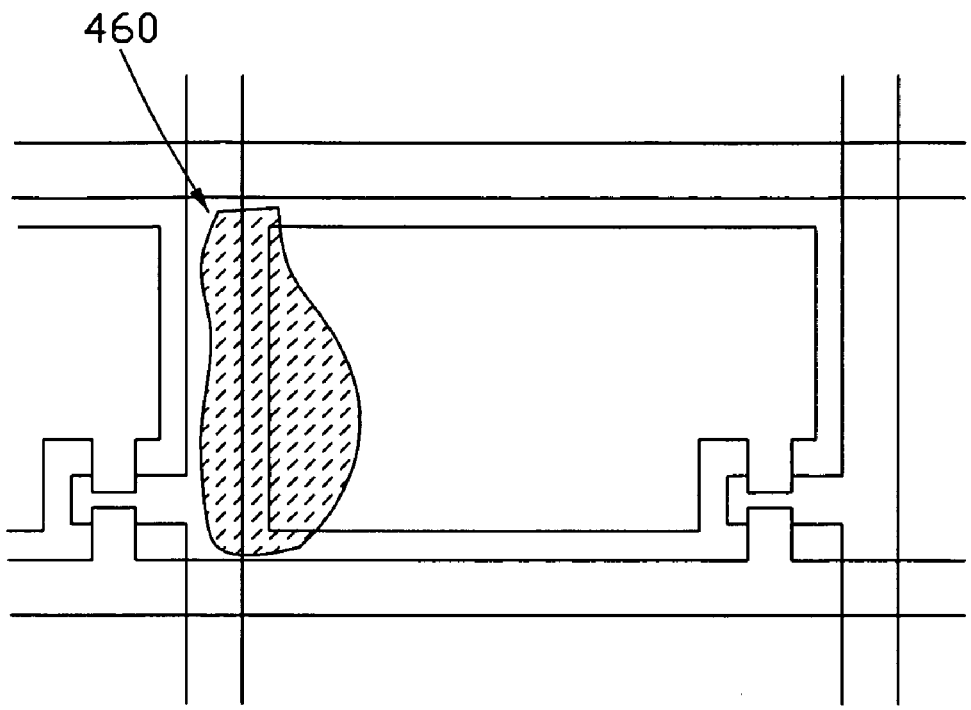

Referring to FIG. 4C, during the time period T2, the pixel unit 40 displays a current image in a desired gray scale, and a voltage signal is supplied to the current scanning line 441. At this time, $V_{gl}-V_{com}<V_p-V_{com}$, that is $V_{gl}<V_p$. Thereby, regions of the second insulating layer 423 corresponding to the (n−1)th (previous) scanning line 441 return to having the greatest hydrophobic characteristics, and regions of the second insulating layer 423 corresponding to the transparent electrode 422 have a smaller hydrophobic characteristics. Therefore, the second liquid 46 is pushed to the containing region 460.

Figure 4D:
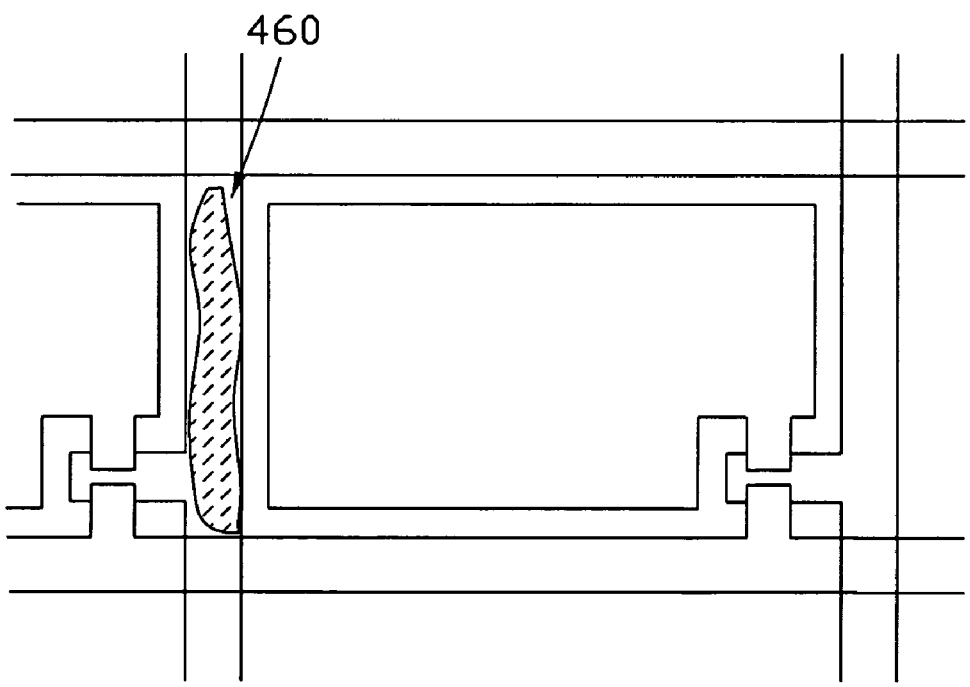

Referring to FIG. 4D, during the time period T3, the pixel unit 40 continues displaying the image, whereas $V_{gl}-V_{com}<V_{pw}-V_{com}$, that is $V_{gl}<V_{pw}$. Regions of the second insulating layer 423 corresponding to the (n−1)th (previous) scanning line 441 return to having the greatest hydrophobic characteristics, and regions of the second insulating layer 423 corresponding to the transparent electrode 422 have lower hydrophobic characteristics. Therefore, all the second liquid 46 is pushed to the containing region 460, such that the pixel unit 40 displays a white image.

Figure 4E:
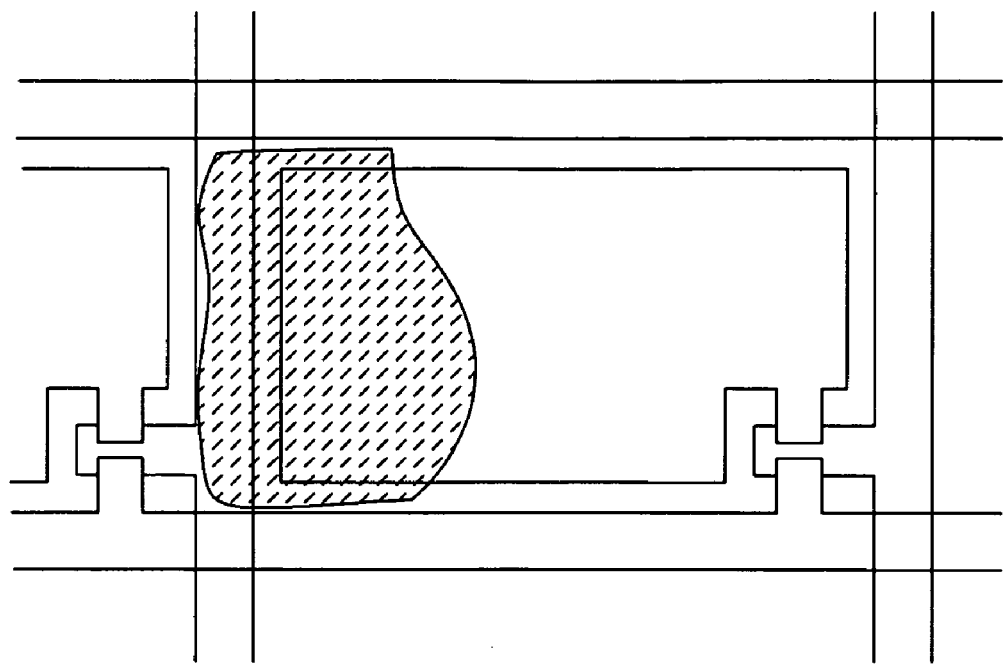

Referring to FIG. 4E, during the time period T4 and before the pixel unit 40 displays the next image, the previous scanning line 441 is scanned. At this time, $V_{gl}-V_{com} \geq V_{pw}-V_{com}$, that is $V_{gl} \geq V_{pw}$. Regions of the second insulating layer 423 corresponding to the (n−1)th (previous) scanning line 441 have hydrophobic characteristics smaller than that of the regions of the second insulating layer 423 corresponding to the transparent electrode 422. Therefore, the first liquid 45 may push the second liquid 46 to the region corresponding to the transparent electrode 422. Similar to the process during the time period T1, the voltage signal supplied to the previous scanning line 441 may generate a pre-driving effect to the pixel unit 40, so as to increase the repeatability of gray scale.

Figure 4F:
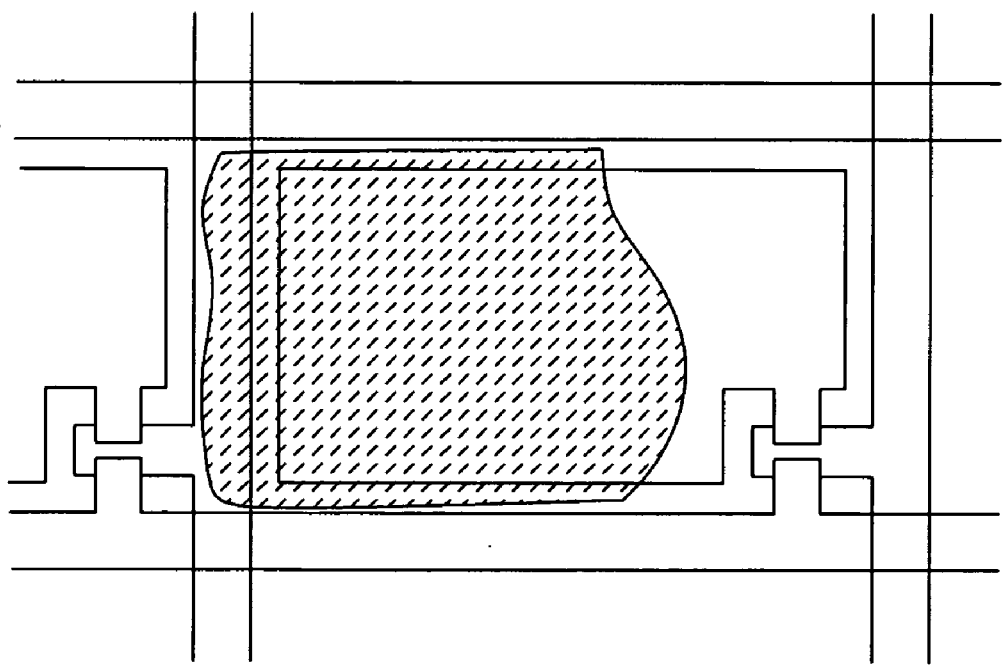

Also referring to FIG. 4F, during the time period T5, the pixel unit 40 displays a current image in a desired gray scale, and a voltage signal is supplied to the current scanning line 441. At this time, $V_{gl}-V_{com}<V_p-V_{com}$, that is $V_{gl}<V_p$. The operation process during the time period T5 is similar to that during the time period T2.

With these configurations, parts of the space 44 of the pixel unit 40 corresponding to the previous scanning line 441 are defined as a containing region 460 for containing the second liquid 46 during the operation process. Meanwhile, the previous scanning line 441 is in a low voltage state when the pixel unit 40 display the current image, then the second liquid 46 may be pushed to the opaque regions corresponding to the previous scanning line 441. Therefore, the EWD device 4 has a high aperture ratio. Moreover, the voltage signal supplied to the previous scanning line 441 may generate a pre-driving effect to the pixel unit 40, which increase the repeatability of gray scale of the images displayed by the pixel unit 40.

Figure 5:
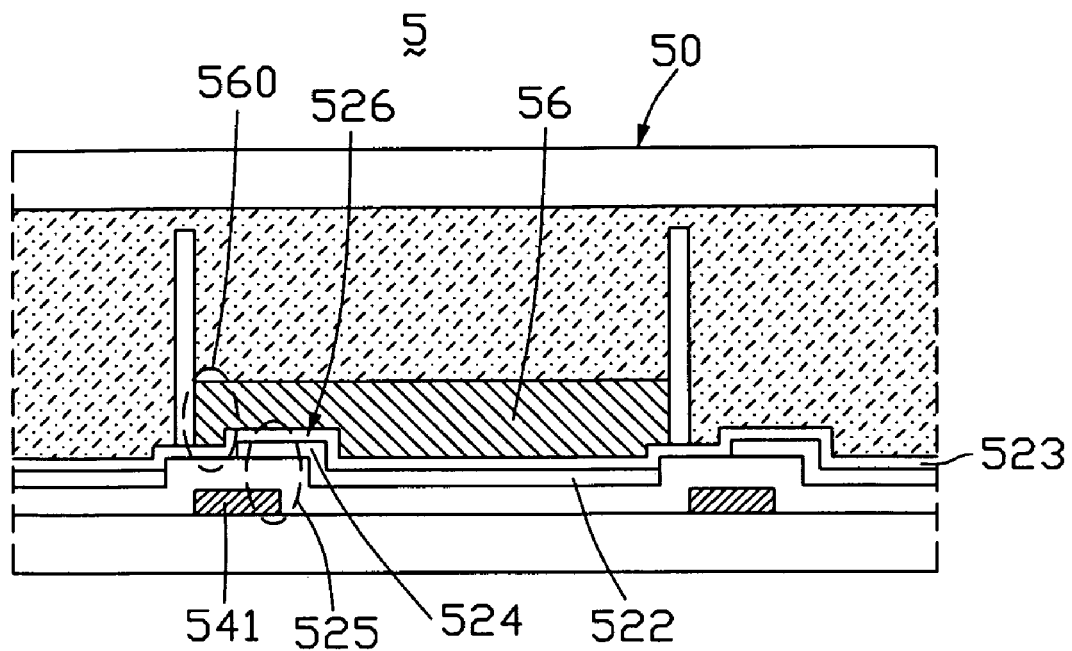
FIG. 5 is a side, cross-sectional view of parts of an EWD device according to a second embodiment of the present invention.

Referring to FIG. 5, a side, cross-sectional view of parts of an EWD device 5 according to a second embodiment of the present invention is shown. The EWD device 5 has a structure similar to that of the EWD device 4. However, the EWD device 5 includes a transparent electrode 522 and a first capacitor electrode 524 extended from the transparent electrode 522. The capacitor electrode 524 cooperates with a corresponding scanning line 541 to form a storage capacitor 525, and cooperates with a second insulating layer 523 to form a protrusion portion 526. The storage capacitor 525 supplies voltage signals to the pixel unit 50 to maintain the pixel unit 50 in displaying a current image. The protrusion portion 526 may stably contain a second liquid 56 in the containing region 560.

Comparing with the EWD device 4, the EWD device 5 can stably contain the second liquid 56 in the containing region 560 and stably displaying images being maintained according to the storage capacitor 525 in each pixel unit 50.

Figure 6:
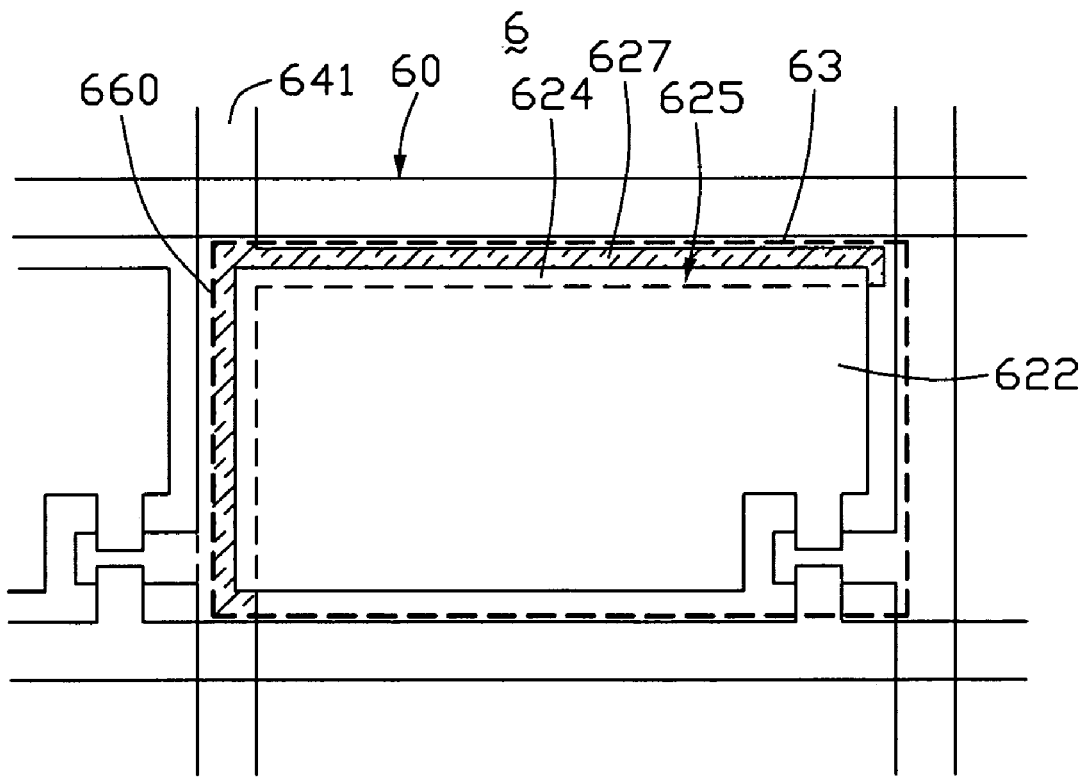
FIG. 6 is a top, plan view of a pixel unit of an EWD device according to a third embodiment of the present invention.

Referring to FIG. 6, a top, plan view of a pixel unit of an EWD device 6 according to a third embodiment of the present invention is shown. The EWD device 6 has a structure similar to that of the EWD device 5. However, each of the pixel units 60 divided by the side wall 63 in the EWD device 6 includes regions corresponding to parts of a previous scanning line 641 and regions corresponding to parts of a current scanning line 641. The previous scanning line 641 has an extending portion 627 extending from the previous scanning line 641 to the pixel unit 60. A transparent electrode 622 includes a first capacitor electrode 624 extending from the transparent electrode 622. The extending portion 627 cooperates with the first capacitor electrode 624 to form a storage capacitor 625. Regions corresponding to parts of the previously scanning line 641 in the pixel unit 60 cooperate with regions corresponding to parts of the extending portion 627 without covered by the first capacitor electrode 624 to form a containing region 660.

Comparing with the EWD device 5, the pixel unit 60 corresponds to parts of the scanning line 641, and the scanning line 641 is in a high level voltage state when the pixel unit 60 display the current image. Thereby, the second liquid may be pushed to the opaque regions more quickly due to parts of scanning line 641 being in a high voltage state, which ensures the EWD device 6 having faster responding time.

Figure 7:
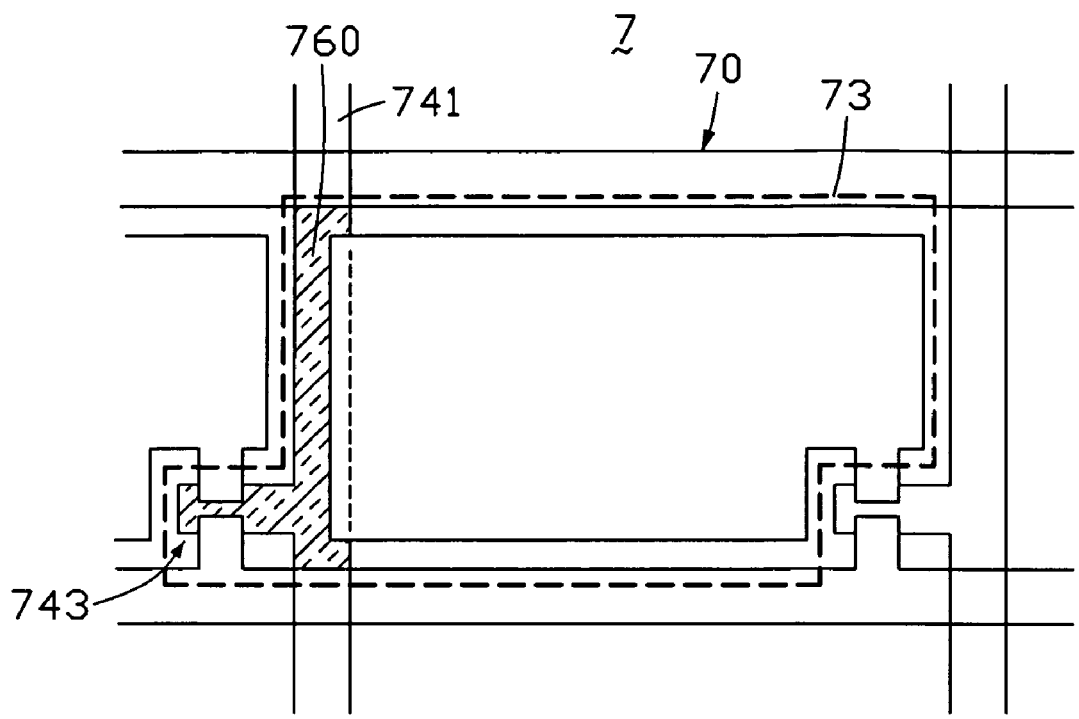
FIG. 7 is a top, plan view of a pixel unit of an EWD device according to a fourth embodiment of the present invention.

Referring to FIG. 7, a top, plan view of a pixel unit of an EWD device 7 according to a fourth embodiment of the present invention is shown. The EWD device 7 has a structure similar to that of the EWD device 5. However, in the region surrounding by the side wall 73 (in the region surrounding by the broken line) the pixel unit 70 includes a thin film transistor 743 electrically connected to the previous scanning line 741. The previous scanning line 741 cooperates with the thin film transistor 743 to form a containing region 760.

Comparing with the EWD device 5, the containing region 760 of the pixel unit 70 of the EWD device 7 has a larger area, which may stably contain the second liquid therein without impairing the aperture ratio of the pixel unit 70.

Figure 8:
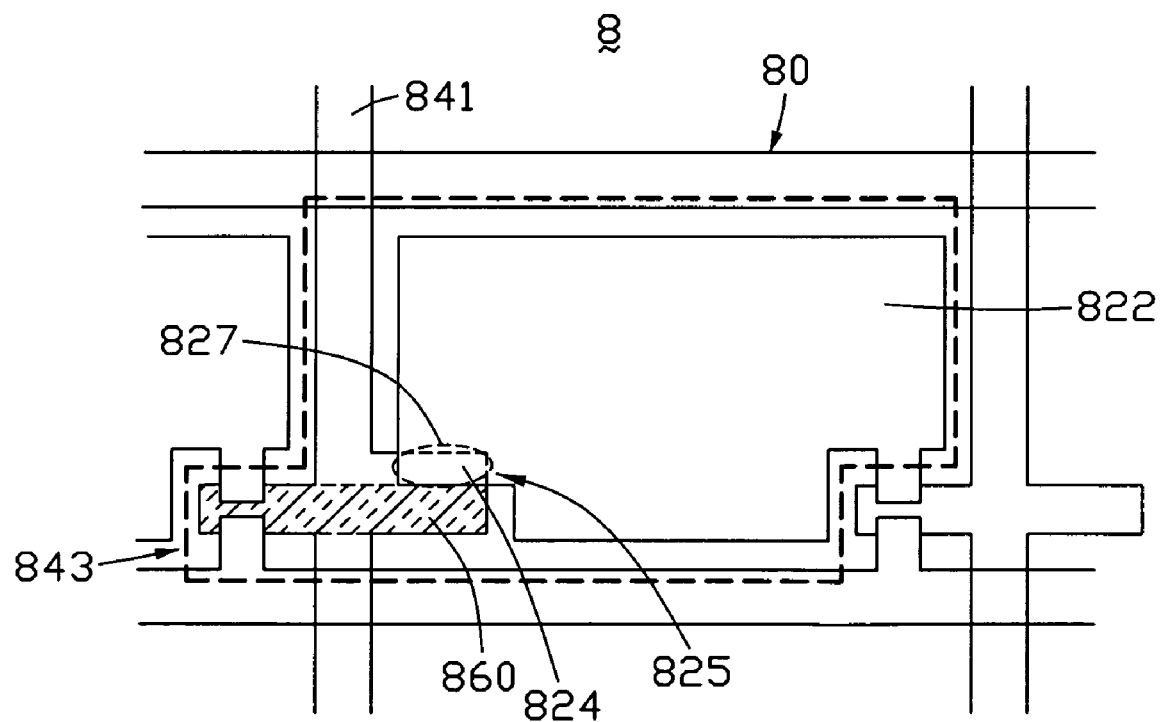
FIG. 8 is a top, plan view of a pixel unit of an EWD device according to a fifth embodiment of the present invention.

Referring to FIG. 8, a top, plan view of a pixel unit of an EWD device 8 according to a fifth embodiment of the present invention is shown. The EWD device 8 has a structure similar to that of the EWD device 7. However, a previous scanning line 841 has an extending portion 827 extending from the parts of the previous scanning line 841 connecting with the thin film transistor 843. The extending portion 827 has a width larger than that of the gate electrode (not labeled) of the thin film transistor 843, and parts of the extending portion 827 corresponding to the gate electrode cooperate with the thin film transistor 843 to form a containing region 860. Further, parts of the extending portion 827 not covered by the gate electrode serve as a second capacitor electrode (not labeled). Parts of the pixel electrode 822 corresponding to the extending portion 827 serve as a first capacitor electrode 824, which cooperates with the second capacitor electrode to form a storage capacitor 825.

Comparing with the EWD device 7, the containing region 860 of the pixel unit 80 of the EWD device 8 has a rectangular shape. Thus, the second liquid contained in the containing region 860 may have less surface energy and stably contain the second liquid therein.

Various modifications and alterations are possible within the ambit of the invention herein. For example, the protrusion 526 of the EWD device 5 may be formed by other structures, and the containing region 860 of the EWD device 8 may be other shapes. Moreover, EWD device may be reflective type, transmission type, or transflective type via combining with different light sources.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of arrangement of parts) within the principles of the invention to the full extent indicated by the broad general meaning of the terms in which the appended claims are expressed.

What is claimed is:

1. An electro-wetting display device, comprising:
   an upper substrate;
   a lower substrate opposite to the upper substrate;
   a plurality of side walls interposed between the upper and lower substrates and cooperating with the upper and lower substrates to form a plurality of pixel units;
   a first polar liquid disposed in the pixel units;
   a second, colored, non-polar liquid disposed in the pixel units, and the second liquid being immiscible with the first liquid;
   a plurality of parallel and spaced apart scanning lines, for providing scanning signals to the pixel units;
   a plurality of parallel and spaced apart data lines that are perpendicular to the scanning lines;
   a plurality of thin film transistors (TFTs), each TFT disposed at an intersection of a corresponding one of the scanning lines and a corresponding one of the data lines, and each TFT coupled to a corresponding scanning line; and
   a plurality of pixel electrodes, each pixel electrode corresponding to a corresponding pixel unit;
   wherein each pixel unit corresponds to at least a part of a corresponding previous scanning line, a corresponding current TFT and a corresponding current pixel electrode, the previous scanning line in a current pixel unit couples to a previous TFT not in the current pixel unit, and the current pixel electrode in the current pixel unit is coupled to the current TFT in the current pixel unit.

2. The electro-wetting display device as claimed in claim 1, wherein the previous scanning line is adjacent to the current scanning line coupled to corresponding current pixel unit, and scanned just before the current scanning line.

3. The electro-wetting display device as claimed in claim 1, wherein a region of each pixel unit corresponding parts of the previous scanning line that define a containing region for containing the second liquid.

4. The electro-wetting display device as claimed in claim 1, further comprising an insulating layer covering the scanning lines, and each pixel electrode in the pixel unit is disposed on the insulating layer.

5. The electro-wetting display device as claimed in claim 4, wherein each pixel unit further comprises a first capacitor electrode, and the first capacitor electrode cooperates with the previous scanning line to form a storage capacitor.

6. The electro-wetting display device as claimed in claim 5, wherein the first capacitor electrode extends from the pixel electrode.

7. The electro-wetting display device as claimed in claim 6, wherein the previous scanning line comprises an extending portion, parts of the extending portion cooperating with the first capacitor electrode to form the storage capacitor.

8. The electro-wetting display device as claimed in claim 4, wherein each thin film transistor has a gate electrode electrically connecting to the corresponding scanning line.

9. The electro-wetting display device as claimed in claim 8, wherein a region corresponding to the gate electrode defines a containing region for containing the second liquid.

10. An electro-wetting display device, comprising:
    an upper substrate;
    a lower substrate opposite to the upper substrate;
    a plurality of side walls interposed between the upper and lower substrates and cooperating with the upper and lower substrates to form a plurality of pixel units;
    a first polar liquid disposed in the pixel units;
    a second, colored, non-polar liquid disposed in the pixel units, and the second liquid being immiscible with the first liquid;
    a plurality of parallel and spaced apart scanning lines disposed on the lower substrate, for providing scanning signals to the pixel units;
    a plurality of parallel and spaced apart data lines perpendicular to the scanning lines;
    a plurality of thin film transistors (TFTs), each TFT disposed at an intersection of a corresponding one of the scanning lines and a corresponding one of the data lines, and each TFT connected to a corresponding scanning line; and
    a plurality of transparent electrode, each transparent electrode corresponding to a corresponding pixel unit;

wherein each pixel unit is covered by a corresponding previous scanning line, a corresponding current and a corresponding current transparent electrode, the previous scanning line in a current pixel unit connects to a previous TFT not in the current pixel unit, and the current transparent electrode in the current pixel unit is controlled by the current TFT in the current pixel unit, a region of the current pixel unit corresponds to the previous scanning line defines a containing region for containing the second liquid when the second liquid being pushed by the first liquid.

11. The electro-wetting display device as claimed in claim 10, wherein the previous scanning line is adjacent to the current scanning line coupled to the corresponding current pixel unit, and is scanned just before the current scanning line.

12. The electro-wetting display device as claimed in claim 10, further comprising an insulating layer covering the scanning lines, and each pixel electrode in the pixel unit is disposed on the insulating layer.

13. The electro-wetting display device as claimed in claim 12, wherein each pixel unit further comprises a first capacitor electrode, and the first capacitor electrode cooperates with the previous scanning line to form a storage capacitor.

14. The electro-wetting display device as claimed in claim 13, wherein the first capacitor electrode extends from the pixel electrode.

15. The electro-wetting display device as claimed in claim 14, wherein the previous scanning line comprises an extending portion, parts of the extending portion cooperating with the first capacitor electrode to form the storage capacitor.

16. The electro-wetting display device as claimed in claim 12, wherein each thin film transistor has a gate electrode electrically connecting to the corresponding scanning line.

17. The electro-wetting display device as claimed in claim 16, wherein a region corresponding to the gate electrode defines a containing region for containing the second liquid.

* * * * *